Inventor
James J. Dickson
By Forest C. Sexton
Attorney

Inventor,
James J. Dickson
By Forest C. Sexton
Attorney

United States Patent Office 3,297,541
Patented Jan. 10, 1967

3,297,541
NUCLEAR REACTOR CORE STRUCTURE
James J. Dickson, Silver Spring, Md., assignor to Allis-Chalmers Manufacturing Company, Milwaukee, Wis.
Original application Jan. 5, 1961, Ser. No. 80,774, now Patent No. 3,208,914, dated Sept. 28, 1965. Divided and this application Sept. 15, 1964, Ser. No. 400,971
5 Claims. (Cl. 176—50)

This is a division of application Serial No. 80,774, filed January 5, 1961, now Patent No. 3,208,914.

This invention relates to nuclear reactors, and more particularly to a more compact core arrangement for nuclear reactors wherein the core elements are horizontally disposed.

Various types of neutronic reactors including pressurized water as well as boiling water and gas cooled (graphite moderated) types have heretofore been proposed for use in self-propelled units. However, the provision of an atomic power plant for mobile units or other compact applications which is satisfactory not only in its technical but also in its various practical aspects presents problems, difficulties and requirements which are peculiar to the environmental and operational conditions of the unit and which are not ordinarily encountered in land based stationary or fixed site installations.

For instance, in the conventional fixed site installation of water-cooled and moderated reactors the reactor vessel and core are normally set up in a vertical position, the control rods are moved axially of the core, shielding is placed not only around the reactor vessel but also above and below it, and the actuating mechanism for the control rods is located generally at one end of the reactor vessel. Such an arrangement of the reactor complex in a stationary installation presents no particular problems in terms of operability, installed or total cost of the reactor complex, or in accessibility of reactor components for inspection, repair, outage and overhaul. However, in mobile or other compact units and in submarines in particular, the conventional vertical arrangement of the reactor entails considerable difficulties due to prevailing environmental and operational conditions. Specifically, in a submarine, the use of reactors with high head room determines the diameter of the pressure hull and hence the silhouette which in turn governs its relative detectability as submerged. The load concentration of the conventional high head reactor, with its heavy shielding also does not allow distribution of loads in the hull to avoid areas of high stress concentration. The metacenter of the vessel cannot be kept as high as would be desirable because of the relatively high location of the center of gravity of the vertically positioned reactor complex.

A further disadvantage of the conventional vertical reactor arrangement in a submarine is the requirement of fuel withdrawal through a considerable distance from the core to the transfer or shipping cask employed as a protective container. This installing or removal distance gives manipulative difficulties in grouping for and attachment of fuel elements.

Another difficulty which is characteristic of the use of vertical reactors in self-propelled units, and particularly in submarines, arises from the change of inclination from the vertical to which the reactor becomes subjected in such use and which, in a submarine, may involve very steep angles fore and aft in dive and surfacing operations. Roll and pitch of the vessel in heavy seas while floating, diving or surfacing must also be anticipated. These conditions affect the gravitational forces on the moving and movable parts of the reactor system as well as the water and steam separation. They may also cause shifting of the water level in the reactor vessel and thereby create a danger of momentary excessive radiation.

Generally, it is an object of the invention to provide an improved core structure for nuclear reactor which lends itself to use as a power source for mobile units and which will take care of the mentioned and other difficulties and requirements of such use in a practical and entirely satisfactory manner.

More specifically, it is an object of the invention to provide an improved nuclear reactor for use in mobile units which affords a relatively low center of gravity as compared with the conventional vertical reactor arrangement.

Another object of the invention is to provide an improved nuclear reactor of the above outlined character employing a reactor vessel which is mounted to lie on its side rather than to stand on end, and control rods which are reciprocable endwise of the reactor vessel so that no head room above or below the reactor vessel will be needed to accommodate the reciprocating movement of these rods.

A further object of the invention is to provide an improved nuclear reactor of the above outlined character wherein access to fuel elements within the reactor vessel is afforded through a top opening intermediate the axially opposite ends of the reactor vessel, and wherein the fuel elements are constructed and arranged so that they may be moved generally endwise through the top opening for loading and unloading the reactor vessel, and may be placed into lengthwise extending operative positions within the reactor vessel.

A further object of the invention is to provide an improved nuclear reactor of the above outlined character wherein control rods are movable axially of the vessel to different positions of adjustment including a scram position, various regulating positions, and a core unloading position wherein the control portions of the rods are entirely withdrawn from the active core region to facilitate installation of the fuel elements within and their removal from the reactor vessel through the mentioned top opening.

A further object of the invention is to provide an improved fuel element and core construction for a nuclear reactor of the hereinabove outlined character, which permits close packing of the fuel elements and which introduces a minimum of neutron absorbing materials into the active core, which insures positioning and retention of the fuel elements in their installed operative positions within the reactor vessel in a simple and inexpensive manner, and which permits selective arrangement of the fuel elements within the reactor vessel in accordance with existing flux distribution and reactivity requirements.

These and other objects and advantages are attained by the present invention, various novel features of which will be apparent from the description herein and the accompanying drawings disclosing an embodiment of the invention, and will be more particularly pointed out in the appended claims.

Referring to the drawings.

Figure 1:
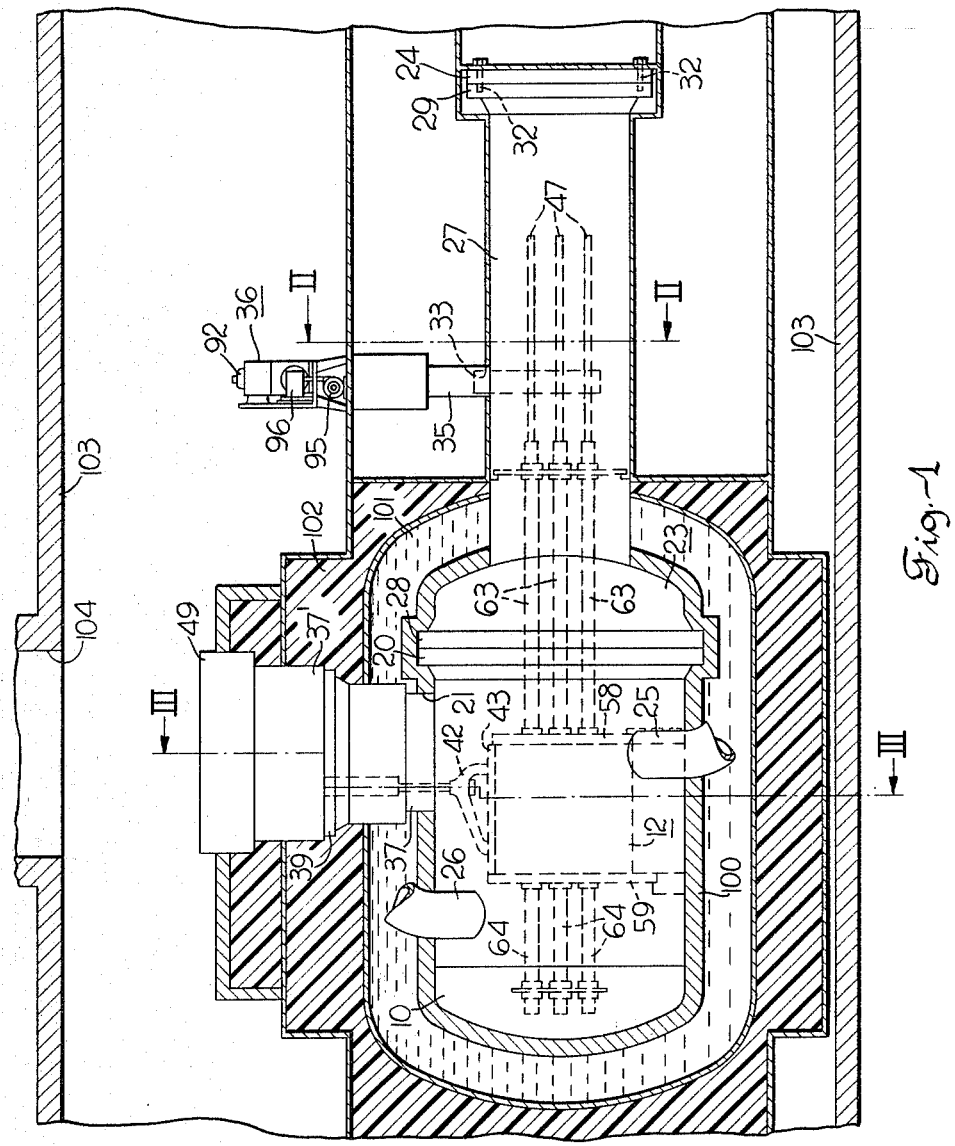
FIG. 1 is an elevational side view of a mobile nuclear reactor and environmental structure, part of the reactor and environmental structure being broken away and shown in aection.
Figure 2:
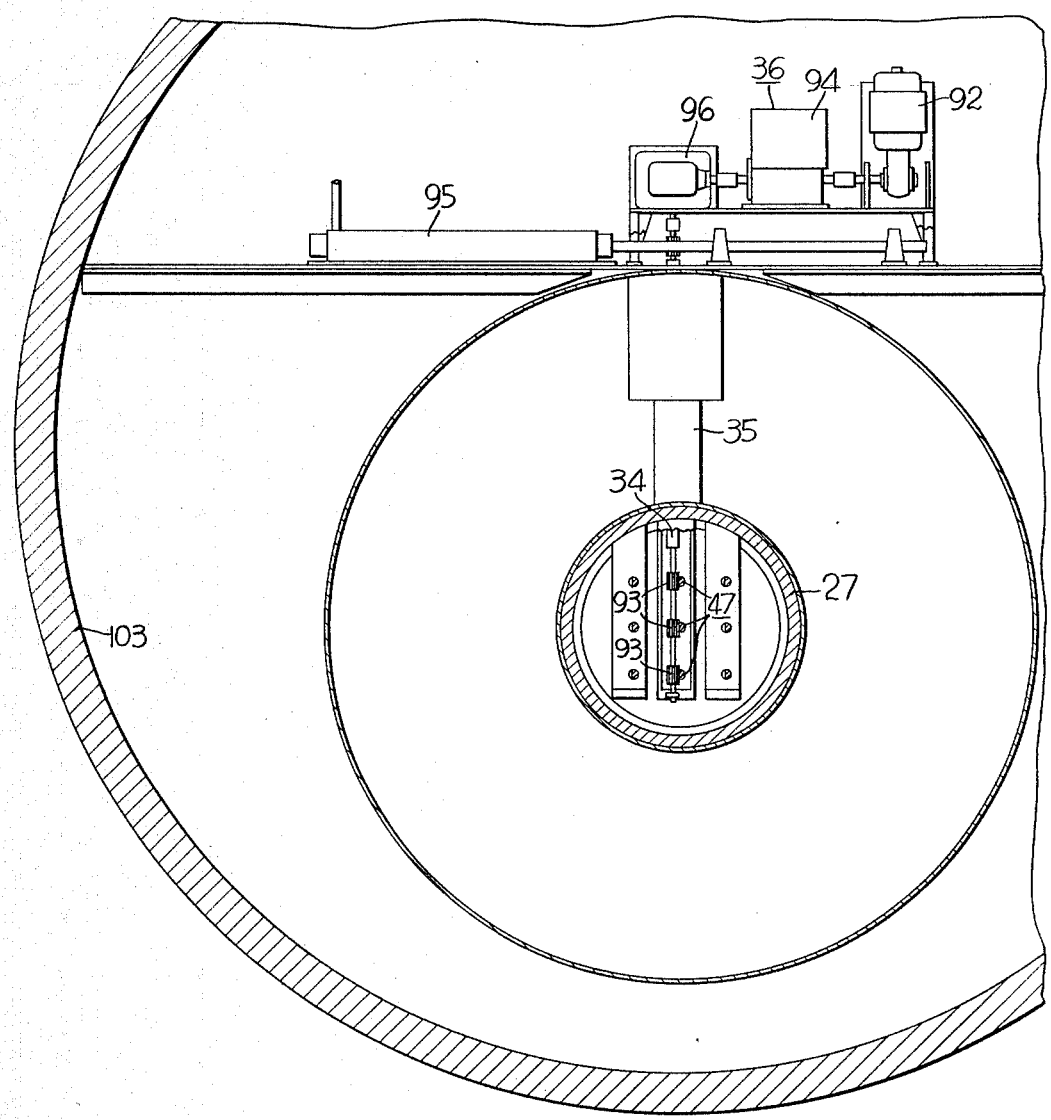
FIG. 2 is an enlarged section taken along line II—II of FIG. 1, part of the environmental structure being broken away.
Figure 4:
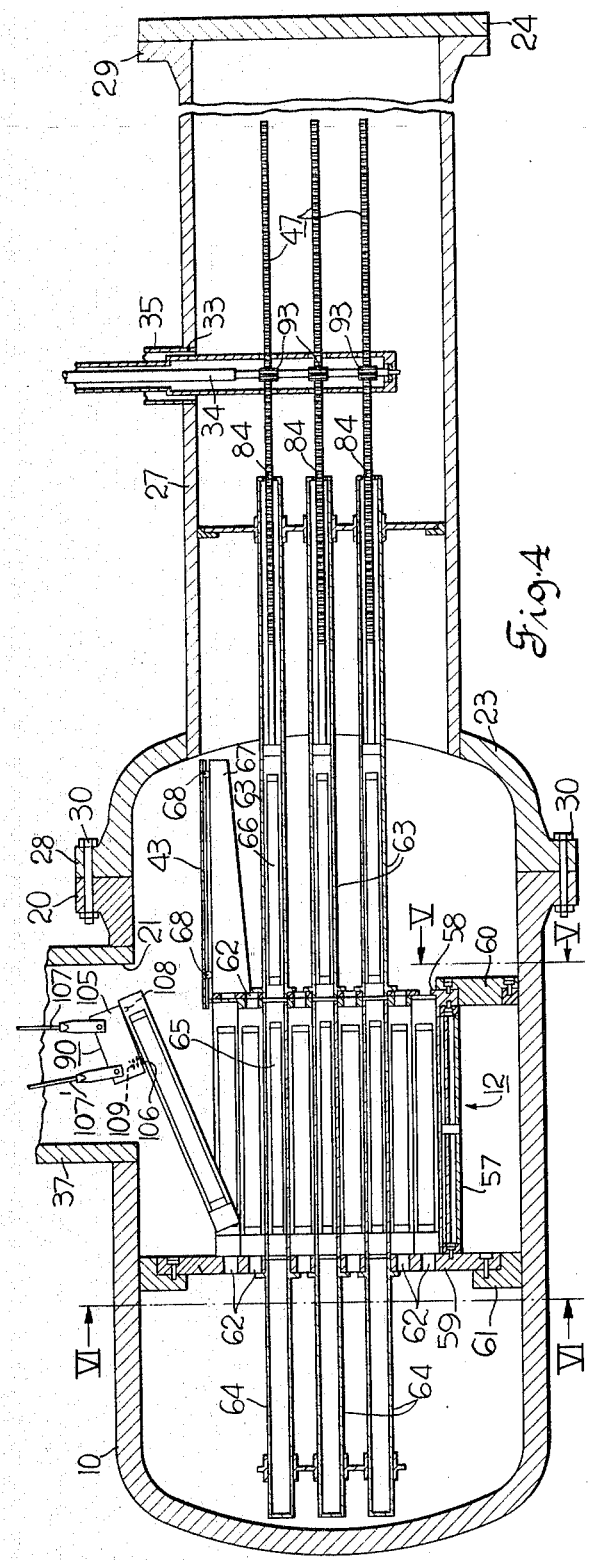
FIG. 4 is an enlarged section on line IV—IV of FIG. 3 with parts omitted and others added to illustrate a procedural step for servicing the reactor.

Referring to the drawings, a horizontal nuclear power plant constructed according to this invention is shown in FIGS. 1 and 4 and includes a pressure vessel 10, a nuclear core 12, a primary coolant circuit 16 including pumping means 17, a heat exchanger 13, a steam circuit 14 including a main turbine 11, a turbogenerator 11′ and a condenser 15, as well as a number of auxiliary apparatuses.

Referring to FIG. 1, a reactor pressure vessel 10 is a horizontally disposed vessel which is closed at one end and open at the other end and which has an outwardly extending flange 20 around its open end. The reactor has an access opening 21 which serves as a refueling port in an upper longitudinally extending side wall of the vessel 10, a refueling port cover 22, an end head 23, an end head cover 24 and coolant inlet and outlet ports 25, 26.

The end head 23 comprises a longitudinally extending tubular housing 27 having outwardly extending flanges 28, 29 at its ends, respectively, and forms a coaxial extension to vessel 10. Housing flange 28 abuts the vessel flange 20 and is attached thereto by means such as bolts 30. A cover 24 is attached to the other housing flange 29 by means such as bolts 32.

To provide adequate sealing, suitable gaskets (not shown) are disposed between flange 29 and cover 24 and flanges 20, 28, and light seal welds are made around the outer periphery of the joint between the flanges 20, 28 and the flange 29 and cover 24.

The end head 23 has three bores 33 defined therethrough transverse to the axis thereof for passage of three control rod drive shafts 34, only one of these bores and shafts being shown. Upward extending adapters 35 are disposed concentrically within the bores 33 and provide means for connecting the control rod drives 36.

The refueling port 21 (FIG. 3) includes an upward tubular extension 37 of the pressure vessel 10 having an internal shoulder 38 and an outward extending flange 39. A shield plug 40 having a shoulder 41 is disposed in the port 21 so that shoulders 38, 41 abut each other. A hold down tripod 42 (FIGS. 1 and 3) depends from shield plug 40 and may be disposed in thrust transmitting relationship against a hold down plate 43 to clamp the core elements against the shroud bottom 57 to maintain the geometric pattern of the core during reactor operation. The tripod 42 is offset from the axis of plug 40 and may be rotated 180 degress to selectively actuate the tripod legs to a core clamping position and to a plug releasing position respectively. In the plug releasing position the tripod legs are aligned with the port 21 for removal with the shield plug 40 and in the core clamping position the tripod legs are disposed in thrust transmitting relationship against the hold down plate 43.

A cover plate 22 is provided for refueling port 21 and is removably mounted to the port flange 39 such as by bolts 46. A suitable gasket such as a metallic gasket (not shown) is disposed between the cover and flange to provide adequate sealing.

Radiation shielding described hereinafter surrounds vessel 10 and includes a removable outer plug 49.

Nuclear core 12 is centrally disposed in vessel 10 and comprises a shroud structure 55 having a compact stacked arrangement of core elements therein the core elements including sixty fuel element assemblies 51, 51′, six dummy fuel assemblies 52, nine control rod ssemblies 47 and nine guide sleeves 53.

Figure 5:
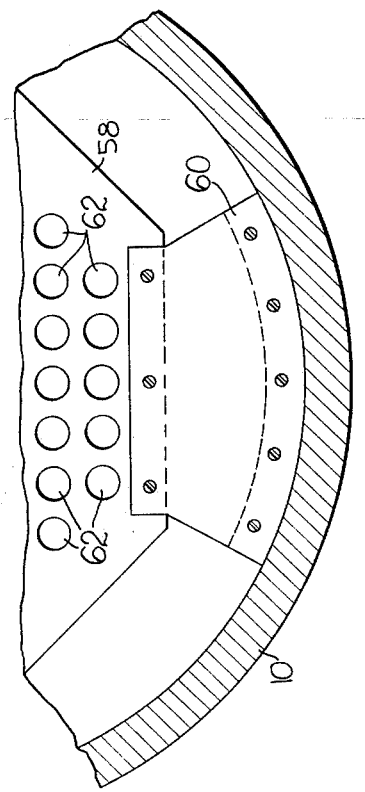
FIG. 5 is an enlarged partial end view taken along line V—V of FIG. 4.
Figure 6:
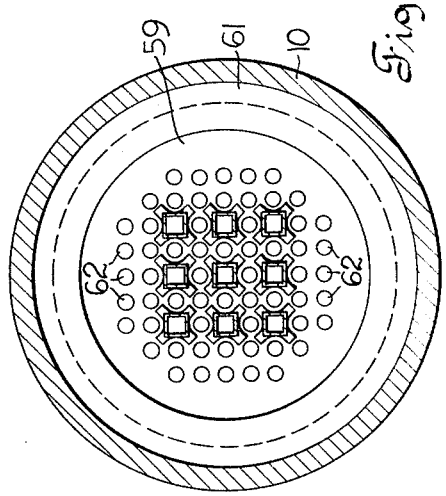
FIG. 6 is a section taken along line VI—VI of FIG. 4.

Shroud 55, having side and bottom portions 56, 57, is supported at each end by front and rear end plates 58, 59 (FIG. 4) that rest on front and rear rings 60, 61 (FIGS. 4 and 5) attached to the shell of vessel 10 as by welding. The rear end plate 59 is fixed to rear ring 61 and the front end plate 58 (FIGS. 4 and 5) is slidably mounted on front ring 60 to accommodate thermal expansion. The end plates 58, 59 have flow openings 62 defined therethrough and guide tube extensions 63, 64 extending therefrom to receive the reciprocable sections 65, 66 of each control rod assembly 47. Shroud 55 is open at the top to allow the core elements to be removed and replaced through the refueling port 21. A handling device such as grappling tool 90 shown in FIG. 4 and described hereinafter is provided to remove and replace the individual core elements.

A spring loaded hold down plate 43 (FIG. 3) is provided to close the top of shroud 55 and prevent movement of the core elements during operation of the reactor. A platform 67 (FIG. 4) extending axially outward from the core 12 is attached to the front core support plate 58 and serves to receive and support hold down plate 43 during refueling operations. The hold down plate 43 may be equipped with wheels 68 to facilitate moving the plate 43 to and from the platform 67.

Figure 3:
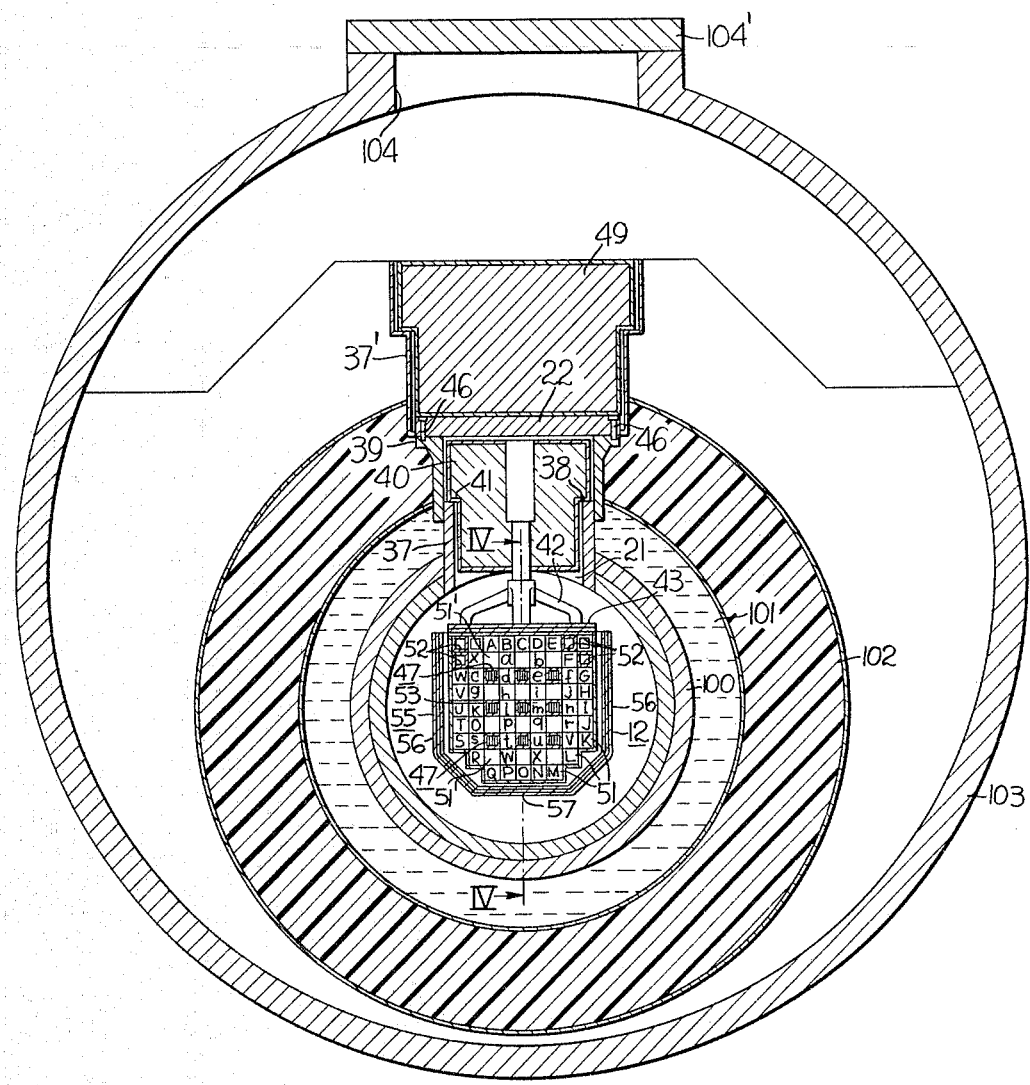
FIG. 3 is an enlarged section taken along line III—III of FIG. 1.

As shown in FIG. 3, the loaded cross section of the core 12 comprises movable and stationary core elements arranged to define an irregular hexagon. The stationary core elements comprise forty-eight fuel assemblies 51, twelve fuel assemblies 51′, six dummy assemblies 52, and nine guide sleeves 53. The movable core elements comprise nine control rod assemblies 47. The core elements are arranged transverse to end plates 58, 59 and are stacked inside the shroud 55 so that each stacked up element rests upon an element below. The core assembly presents a uniform top surface, and the pressure exerted upon it by the hold down plate 43 not only secures the core elements against upward movement, but also causes the core elements to bear upon each other so that the core geometry will be maintained during operation of the reactor.

Figure 7:
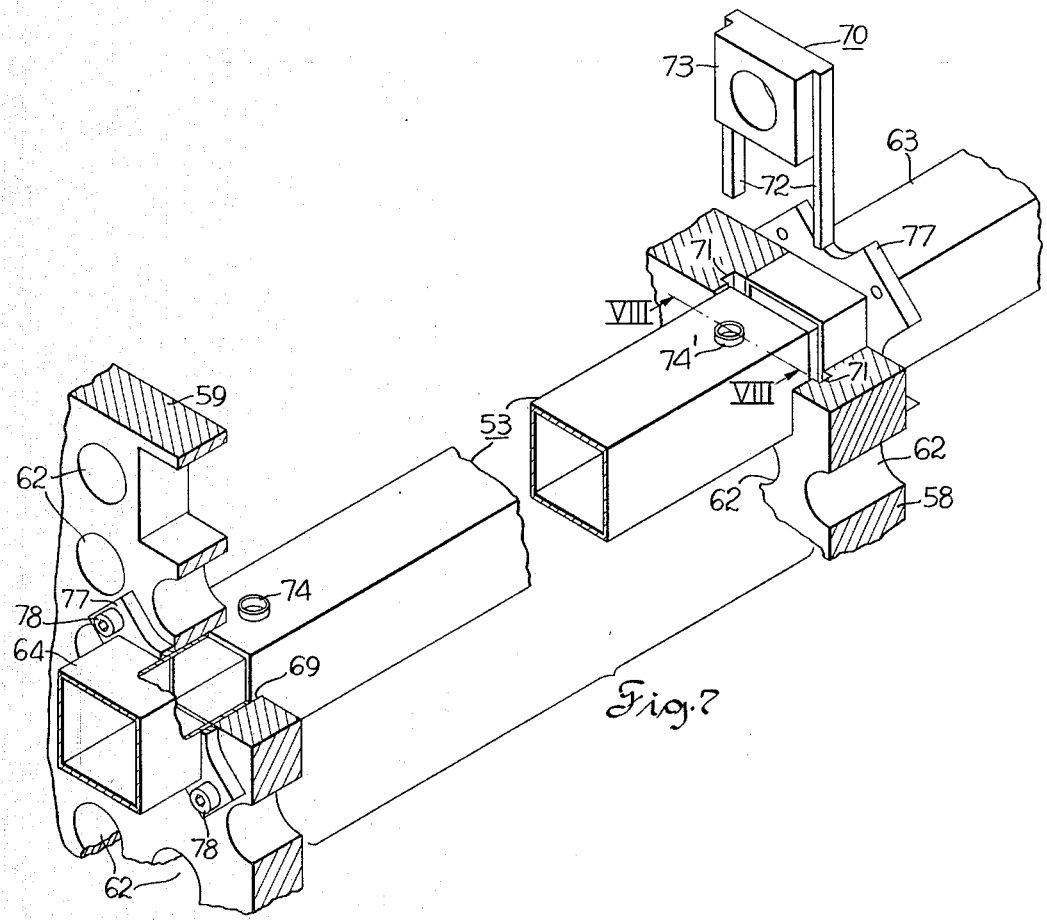
FIG. 7 is an isometric schematic view of a subassembly of parts shown in FIGS. 4 and 6, portions of the subassembly shown being broken away and shown in section.

The control rod guide sleeves 53 (FIG. 3) are removable in the same way as the fuel assemblies 51, 51′ and have substantially the same circumferential dimensions as the fuel assemblies 51, 51′, but are slightly longer than the latter. Referring to FIG. 7, alignment of the guide sleeves 53 with the respective guide sleeve extensions 63, 64 is achieved by a socket 69 and a keyed spacer arrangement 70 in the core end plates 59, 58, respectively. Sockets 69 are defined in the rear end plate 59 and the front end plate 58 has suitable keyways 71 defined therein to receive keyed spacer 70. Each spacer 70 is provided with legs 72 that are received by keyways 71 in the front end plate 58 and a square boxlike portion 73. The length of the legs 72 measured from their distal ends to the body 73 is equal to the height of the guide sleeve 53, and the portion 73 is of the same height and width as a fuel assembly whose height and width are in turn equal to the height and width of the sleeve 53. The axial thickness of the boxlike portion 73 is greater than the axial width of the keyways 71.

The guide sleeves 53 are disposed between the front and rear end plates 58 and 59 by lowering each sleeve 53 into its respective location in the shroud 55 during the normal sequential loading operation, and pushed rearward until seated in its rear end plate socket 69. A keyed spacer 70 is then inserted in a front end plate keyway 71 to accurately position and lock the sleeve 53 in the core. The spacer legs 72 abut the end of the guide sleeve 53 to prevent axial displacement thereof. The square boxlike portion 73 of spacer 70 rests on the guide sleeve 53 to accurately space the guide sleeve 53 directly above and provide a flush interior surface on the front end plate 58 directly above the guide sleeve 53.

Figure 8:
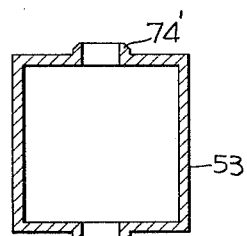
FIG. 8 is a transverse cross section view taken along line XVI—XVI of FIG. 7.

The guide sleeves 53 are registered with the fuel assemblies 51' immediately above and below by providing outward extending pins 74' (FIGS. 7 and 8) having bores 74 coaxially therewith in the end portions of the upper and lower surfaces thereof. The pins 74 are received by mating holes in the fuel assemblies 51' disposed below and above the guide sleeves 53.

The guide sleeve extensions 63, 64 (FIG. 4) have flanges 77 (FIG. 7) associated therewith and are removably attached to the axially outward side of the end plates 58, 59, respectively, as by bolts 78 and extend parallel to the core axis. Because of the relative inaccessibility of the guide sleeve extensions 63, and 64 each guide sleeve extension 63, 64 is provided with Stellite faced surfaces to reduce wear. Thus, the wear is largely confined to the removable portions of the control elements which are readily removed and replaced during normal refueling operations.

The fuel assemblies 51, 51' are boxlike assemblies containing the fuel in any such form as will allow water passage longitudinally therethrough.

The dummy fuel assemblies 52 (FIG. 3) are unitary square tubes closed at the ends to prevent coolant from bypassing the active assemblies 51, 51' and have similar external dimensions as assemblies 51.

It is to be noted that the fuel assemblies 51, 51' as herein disclosed do not utilize end adapters that require accurate registration with conventional core end or grid plate coolant inlet and outlet ports. Thus, the core elements may be closely packed, one upon the other, providing mutual reinforcement of adjacent core elements, thereby eliminating individual core element supports. In addition, the fuel assemblies 51, 51' and dummy assemblies 52 are alike at either end which permits end to end reversal thereof during the core loading.

The core is controlled in conventional fashion by nine control rod assemblies 47 in a three times three array around the core center line. The reactor power is adjusted by endwise movement of the rods 47 between a scram position and an operating position.

To provide adequate circulation of coolant through the core, the fuel assemblies 51, 51' are open at the ends thereof, the guide sleeve extensions 63, 64 are provided with apertures 84 (FIG. 4) at the ends thereof, and each control assembly 47 has apertures defined therethrough.

It will be appreciated that the core and associated equipment are provided with a biological shield as is conventional in the art. As utilized in the present embodiment and shown in FIG. 3, the shielding comprises thermal insulation 100, a layer of iron shot, water and boron 101 and a layer of polyethylene 102.

Access to the port cover plate 22 (FIG. 3) through the shielding is provided by an extension 37' of the refueling port 21 having a second or outer shield plug 49 disposed therein removably secured to the extension 37 by conventional means such as bolts.

In general, the herein disclosed core structure produces thermal energy in accordance with well known principles of nuclear physics. The core elements are inserted in place within the shroud 55 of the reactor by the grappling tool 90 through refueling port 21 in vessel 10. The refueling port cover 22 is attached to close the vessel 10 and primary coolant is introduced therein.

It will be appreciated that other necessary associated auxiliary equipment is conventional and includes such items as a pressurizing system, a coolant pressure relief system, any necessary nuclear instrumentation, coolant purification and replacement systems and emergency equipment.

After the core has operated for its useful life, it is necessary to refuel. Any fuel handling procedures approved by the Atomic Energy Commission may be utilized to refuel the reactor. In the refueling process the removable core elements comprising six dummy elements 52, forty-eight fuel element assemblies 51, twelve fuel element assemblies 51', nine control rod guide sleeves 53, nine control rod assemblies 47 may be removed.

A grappling tool 90 having means to securely engage the end portion of each removable core element removes each core element generally endwise from the vessel 10 through refueling port 21.

Grappling tool 90 comprises a rectangular bar 105 having a surface 106 for abutting the core elements, handles 107, 107' pivotally mounted remote from surface 106 and remote from each other, and a locking arrangement to securely engage individual core elements to the grappling tool 90. The locking arrangement comprises a pin 108 fixedly projecting from surface 106 at one end of bar 105, and a biasing member such as spring 109 yieldingly projecting from surface 106 at the other end of bar 105. To actuate the locking arrangement, the pin 108 is aligned with a core element hole 75 or bore 74 and the spring 109 is compressed to cause surface 106 to abut the surface of a core element thereby permitting pin 108 to be fully inserted into hole 75 or bore 74. The pin 108 is proportioned to freely enter hole 75 or bore 74 but upon release of the compressed spring 109 it is cocked in the hole and becomes jammed so that it will securely lock any desired core element to the block 105. The core element may then be manipulated by pulling upward on either or both handles 107, 107'. In order to release the core element from the grappling tool, the core element may be placed on any suitable supporting surface and the handle 107' is pushed down while the handle 107 is pulled up.

It is to be noted that the core elements have a longitudinal dimension greater than the diameter of refueling port 21. However, the pivoted handles 107, 107' permit the core elements to be transferred in a generally endwise direction through refueling port 21.

The shroud 55 is unloaded sequentially beginning with the top row of core elements. In the rows having control rod guide sleeves 53 and control rod assemblies 47, the removable portions are removed as follows:

(1) The control rod assembly 47 is withdrawn into control rod guide sleeve extension 63;

(2) Keyed spacer 73 (FIG. 7) is removed from keyway 71;

(3) Grappling tool 90 is manipulated to engage and remove guide sleeve 53; and (4) Assembly 47 is advanced into the core space to permit tool 90 to engage and remove said assembly 47. In reloading the core, a reverse procedure is followed. The forty-eight fuel element assemblies 51 are divided into two groups; a radially innermost and a radially outermost group shown in FIG. 3 as elements a–x and A–X, respectively. In unloading the core, the twenty-four fuel element assemblies 51 identified as core elements A–X are maintained separate from the other removed elements and may be used in reloading the core, being disposed in the spaces formerly occupied by core elements a–x. All other fuel bearing core elements are replaced with new fuel bearing elements.

The reactor will again be in condition for operation with the essential properties of a fully charged core.

It is understood that this invention is not to be limited to the details given herein, but that it may be modified within the scope of the appended claims.

What is claimed is:

1. A core structure for a nuclear reactor comprising, a support having an elongated base portion and a pair of parallel, relatively spaced plate members extending transversely of said base portion and each having coolant circulating apertures extending therethrough from one side of said plate member to the other, an array of elongated fuel element assemblies having coolant passages longitudinally therethrough stacked on said base portion between and in transversely extending relation to said plate members such that the coolant passages through said fuel element assemblies will coincide with the apertures through said plate members; a cover member extending along the side of said array opposite to said base portion, and thrust transmitting means releasably secured against said cover means to clamp said array against said base portion.

2. A core structure as set forth in claim 1, wherein said fuel element assemblies have open ended, longitudinal, internal passages in coolant receiving relation with the apertures of one of said plate members and in coolant emitting relation with the apertures of the other of said plate members.

3. A core structure for a nuclear reactor comprising, a support having an elongated base portion and a pair of parallel, relatively spaced plate members extending transversely of said base portion, an array of elongated tubular elements stacked in layers on said base portion and supported thereon independently of and in transversely extending relation to said plate members, a cover member extending along the side of said array opposite to said base portion, thrust transmitting means releasably secured against said cover means for clamping said array against said base portion, and neutronic fuel sections fixedly secured within some of said tubular elements; said plate members having apertures in registering relation with each of said tubular elements, said tubular elements which are devoid of said fuel sections having means to prevent flow of coolant therethrough.

4. A core structure as set forth in claim 3 and further comprising sleeve members secured to one of said plate members at the side thereof which faces away from said array, said sleeve members extending transversely of said one plate member in registering relation, respectively, to said apertures therein.

5. A core structure as set forth in claim 3 and further comprising elongated control rod supporting members secured to one of said plate members at the side thereof which faces away from said array, and elongated control rod guide members secured to the other of said plate members at the side thereof which faces away from said array, said supporting and guide members extending transversely of said plate members in alignment, respectively, with said apertures therein.

References Cited by the Examiner
UNITED STATES PATENTS

| | | | |
|---|---|---|---|
| 2,780,596 | 2/1957 | Anderson | 176—30 |
| 2,970,097 | 3/1961 | Correc | 176—41 |
| 3,026,258 | 3/1962 | Huet | 176—41 |

CARL D. QUARFORTH, *Primary Examiner.*

L. DEWAYNE RUTLEDGE, *Examiner.*